Aug. 2, 1927.

E. CREWDSON 1,637,636

CONTROL OF PRIME MOVERS

Filed March 24, 1926

Inventor
Eric Crewdson,
By Sturtevant & Mason
Attorneys.

Aug. 2, 1927.

E. CREWDSON 1,637,636

CONTROL OF PRIME MOVERS

Filed March 24, 1926

Inventor:
Eric Crewdson,
By
Attorneys.

Aug. 2, 1927.

E. CREWDSON 1,637,636

CONTROL OF PRIME MOVERS

Filed March 24, 1926   3 Sheets-Sheet 3

Inventor:
Eric Crewdson

Patented Aug. 2, 1927.

1,637,636

UNITED STATES PATENT OFFICE.

ERIC CREWDSON, OF KENDAL, ENGLAND.

CONTROL OF PRIME MOVERS.

Application filed March 24, 1926, Serial No. 97,044, and in Great Britain April 1, 1925.

The present invention relates to improvements in the control of prime movers and is more particularly applicable to the control of water turbines or wheels or of internal combustion engines and the like prime movers which operate efficiently only upon substantially a constant load.

According to the present invention a part driven directly or indirectly from the prime mover shaft is adapted for the generation of Foucault or eddy currents, which serve to absorb surplus energy of the prime mover as an alternative to throttling of the water or gas supply stream to the prime mover.

The invention will be more particularly described with reference to its application to a water turbine taken by way of example. In this case for instance, a metal disc or cylinder is driven directly or indirectly from the shaft of the water wheel or turbine and surrounding this cylinder or disc are placed stationary electromagnets so arranged that when they are excited by passing current through them they create a magnetic field or number of magnetic fields in which the metal disc or cylinder rotates.

In accordance with well known principles eddy currents will be set up in the rotating part which will cause a resistance to its motion and so tend to check the rotation of the turbine.

By varying the amount of current passed through the coils of the electromagnet the magnetic field will be varied and also the strength of the eddy currents and the resistance to motion.

It is obvious, therefore, that if a suitable means can be found for varying the current through the electromagnets approximately in the inverse ratio to the useful external load which the turbine is supplying a steady load will be put upon the turbine and its speed will remain constant whatever the external load may be up to the full capacity of the turbine. For if the useful external load is only a small proportion of the full output of the turbine the strength of the electromagnets and their field will be made large and the resistance to the rotation of the turbine caused by the eddy currents in the disc or cylinder will be correspondingly large. Again if the useful load is a large proportion of the full output the strength of the electromagnets will be made small and the retardation due to the eddy currents will be correspondingly small.

If therefore, the eddy current retardation be made the exact complement of the external useful load a steady load will be kept on the turbine and for a constant opening of its gates a constant speed will be maintained.

The invention will be particularly of service in cases where there is no storage of water for the turbine to draw from and where if the turbine does not use the water the latter must be run to waste.

In many cases particularly where a turbine is supplied through a long pipeline on a low head of water the usual method of regulating the speed by varying the amount of water used in the turbine has caused much inconvenience due to the fact that to regulate the water thus its velocity in the supply pipe must be rapidly checked or accelerated. This causes undesirable and even dangerous variation of pressure, which can only be counteracted by relief valves, stand pipes, surge tanks and so on. These supplementary fittings always add to the expense and generally to the complication of the plant. Moreover the turbine gates cannot be moved instantaneously so that to obtain a steady speed by this means heavy flywheels must often be used to supply the deficiency or absorb the surplus of energy while the gates are being moved to adjust the turbine to the new conditions of load.

A further advantage of the invention is that it can be made to maintain the full load on the turbine whatever the external useful load may be. This is particularly of service in low fall high specific speed turbine plants where running the turbine at small fractions of its full output may very quickly cause pitting of the runner blades, and a serious loss of efficiency.

The invention is more particularly described with reference to the accompanying drawings in which:—

Figure 1:
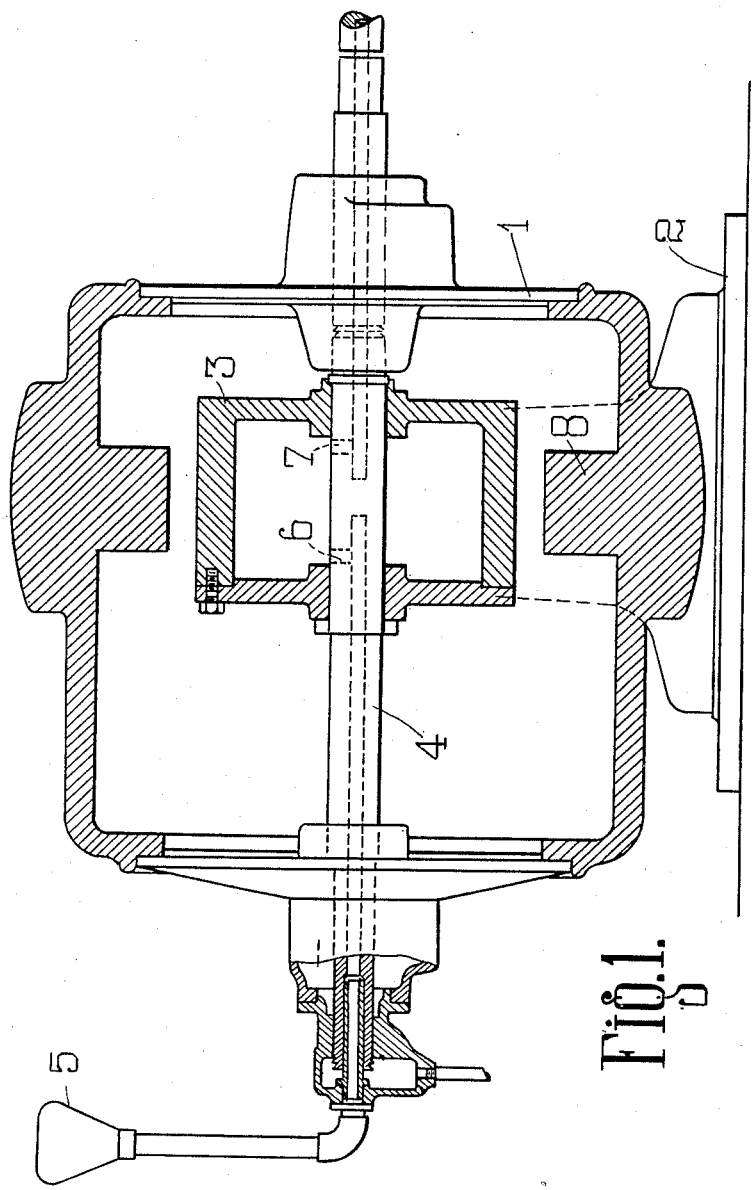
Figure 1 is a view in partial cross section of a water cooled brake adapted to receive the artificial load bringing the useful external load up to the normal output of the turbine.

In the drawings and particularly in Figure 1 a casing 1 is mounted on a bed plate 2 and is adapted to enclose a brake drum or cylinder 3, keyed or otherwise suitably fixed to a rotating shaft 4 which is driven directly or indirectly from the prime mover shaft (not shown). This shaft 4 is hollow over the major portion of its length and is supplied with water from a funnel 5. Such water supply is for cooling purposes and travels from the funnel 5 along the shaft 4 as far as an orifice 6 where it enters the brake drum or cylinder 3 to cool this. The water re-enters the hollow shaft 4 by means of an orifice 7 and is then carried to a discharge pipe (not shown). In the case of small turbines involving in consequence a small brake, the latter may be air cooled instead of water cooled as shown, in which case the shaft may be solid instead of hollow as indicated in the drawings.

Figure 2:
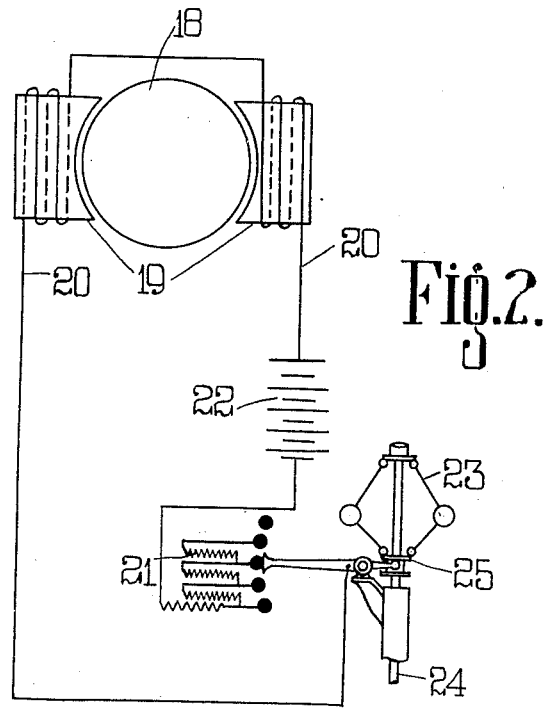
Figure 2 is a diagrammatic view of an arrangement whereby the artificial load is automatically applied by means of a pendulum type of governor, a resistance actuated by such governor, and a single winding around the poles of the brake.

In Figure 2 an arrangement for automatically regulating the artificial load on the turbine is diagrammatically illustrated. The brake drum which is directly or indirectly driven from the turbine is shown at 18. A number of magnets 19 are supplied with one winding 20 only.

A rheostat or resistance 21 is connected in series with this winding 20, whilst a source of exciting current is indicated at 22. A pendulum governor is indicated at 23 and its shaft at 24, this shaft being driven either directly or indirectly from the prime mover. As the speed of rotation of the shaft 24 of the governor increases, a sleeve 25, mounted to rotate with such shaft 24, rises and carries with it one end of a lever pivoted about a point displaced radially from the axis of the sleeve, the other end of such lever being arranged to engage with any one of a number of stages of the resistance 21. In consequence of such a rise in speed of the shaft 24 a smaller portion of the resistance 21 will enter in the electrical circuit, with the result that more eddy currents will be created and a greater artificial load applied to the plant. When the turbine speed falls due to its being overloaded the resistance of the winding circuit will be increased to relieve the turbine of part of its eddy current or artificial load i. e. the reverse action will take place.

In this form the brake governor may clearly be used to control a turbine which is supplying mechanical and not electrical load, if suitable external means be found for providing the exciting current of the electromagnets.

It is obvious that in the case of large machines and particularly in the case of brakes provided with one winding controlled by a pendulum governor the brake magnets may be arranged to rotate and to be surrounded by a frame of cast iron or steel in which the eddy currents are formed. The rotating magnetic field may thus be provided by a rotor having slip rings and by this means the cooling water arrangement may be simplified by introducing such water to the stationary portion only of the apparatus.

Figure 3:
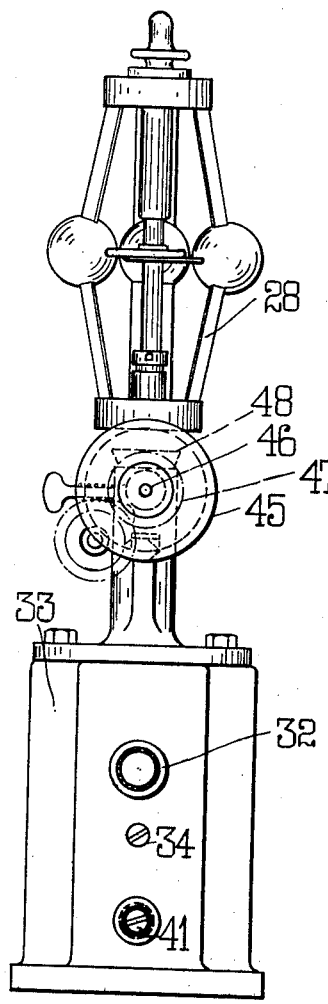
Figure 3 is a view in elevation of a suitable control arrangement for the artificial load.
Figure 4:
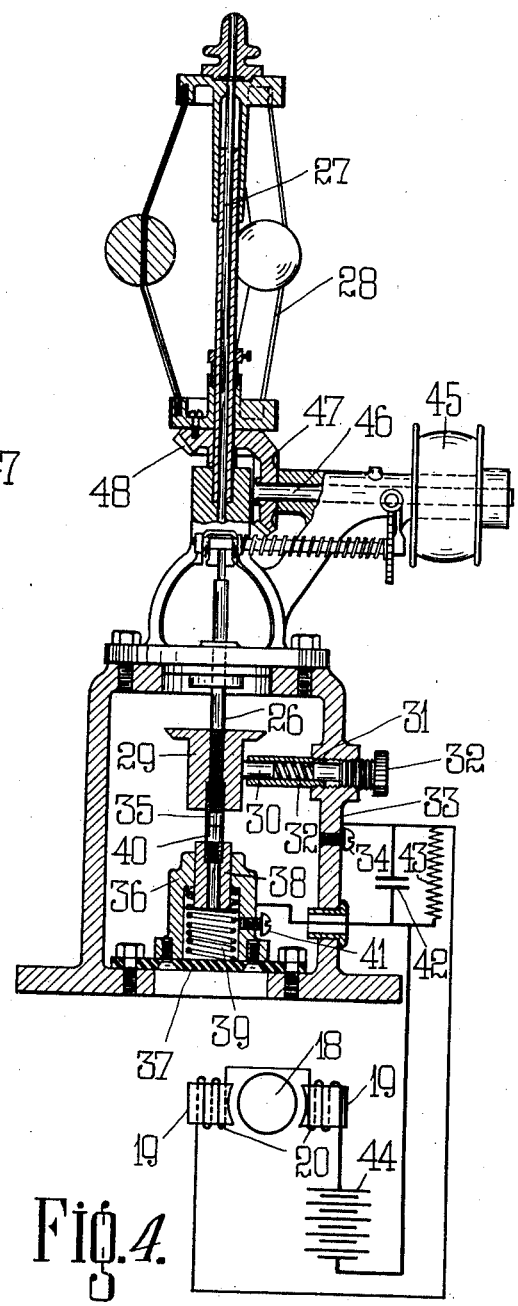
Figure 4 is a cross sectional view of Figure 3 with a diagrammatic view of the electrical circuit added thereto.

Referring to Figures 3 and 4 of the drawings a rod or spindle 26 has a longitudinal movement with a spindle 27 of a pendulum 28, which is driven directly or indirectly from the turbine e. g. by means of a pulley 45, shaft 46, and bevel gear 47, 48. This rod 26 has secured to it a metal sleeve 29. A contact brush 30 is held in contact with this metal sleeve 29 by means of a helical spring 31 enclosed with the brush 30 within a tubular screw 32 which is in turn attached to a main casting 33.

A terminal screw 34 is provided on the casting 33, whilst a platinum or the like contact 35 is provided on the lower end of the spindle 26.

A casting 36 is fitted to the main casting 33 and is insulated therefrom by an insulating plate 37. A cylindrical member 38 is held within the casting 36 and at the upper portion of this the said member 38 being held in this position by means of a helical spring 39. This cylindrical member 38 is also provided with a platinum or the like contact 40. A terminal screw 41 is fitted to the casting.

It will be seen that as the speed of the governor 28, which is driven directly or indirectly from the turbine, rises or falls the spindle 26 is lowered or raised respectively thereby making or breaking contact between the contacts 35 and 40.

The function of the brush 30 and its attachments is to convey current from the terminal screw 34 to the contact point 35. The screws 34, 41 are the terminals of an electrical circuit including a condenser 42, high resistance 43, an exciting source 44, magnets 19 and windings 20 for the magnets. The function of the condenser 42 and the resistance 43 is to prevent excessive sparking at the contacts 36, 40.

When the speed of the set rises too high the portions 35 and 40 make contact and a current flows around the windings 20 of the magnets 19 thus creating eddy currents and putting an artificial load on the turbine.

The strength of the windings 20 is so designed that when the full voltage is applied to them in this way the turbine becomes overloaded and the speed begins to fall. When the speed has fallen below the desired figure the contacts 35 and 40 are broken due to the rise of the pendulum governor spindle 27, with the result that the brake 18 is relieved of its artificial load and the speed of the set again rises.

In actual working under any particular condition of load, contact is continually being made and broken between the points 35 and 40 with the result that a substantially constant speed is maintained.

I declare that what I claim is:—

1. Apparatus for controlling the speed of prime movers comprising a metal element rotated from the prime mover, electromagnets creating an electromagnetic field through which the said element rotates thereby creating eddy currents and setting up an artificial load on the metal element, a governor driven from the said prime mover, and means to control the circuit including the said electromagnets by the said governor.

2. Apparatus for controlling the speed of prime movers comprising a metal element rotated from the prime mover, electromagnets creating an electromagnetic field through which the said element rotates thereby creating eddy currents and setting up an artificial load on the metal element, a governor, driving means for the said governor connected to the prime mover, and an impedance actuated by said governor to vary the current supplied to the electromagnets to vary the strength of the field and the artificial load.

3. Apparatus for controlling the speed of prime movers comprising a metal element rotated from the prime mover, electromagnets creating an electromagnetic field through which the said element rotates thereby creating eddy currents and setting up an artificial load on the metal element, a governor, driving means for the said governor connected to the prime mover, and a resistance actuated by said governor to vary the current supplied to the electromagnets to vary the strength of the field and the artificial load.

4. Apparatus for controlling the speed of prime movers comprising a metal element which is hollow, is adapted to provide a large heat radiating surface, and is rotated by the prime mover, electromagnets creating eddy currents and setting up an artificial load on the metal element, and a governor adapted to regulate the excitation strength of the electromagnetic field so that the artificial load is complementary to the useful external load on the prime mover.

5. Apparatus for controlling the speed of prime movers comprising a hollow metal element rotated by the prime mover, means to pass cooling fluid through the said hollow metal element electromagnet creating eddy currents and setting up an artificial load on the metal element, and a governor adapted to regulate the excitation strength of the electromagnetic field so that the artificial load is complementary to the useful external load on the prime mover.

6. Apparatus for controlling the speed of prime movers comprising a hollow metal element rotated by the prime mover, means to pass cooling water through the said hollow metal element, electromagnets creating eddy currents and setting up an artificial load on the metal element, and a governor adapted to regulate the excitation strength of the electromagnetic field so that the artificial load is complementary to the useful external load on the prime mover.

In witness whereof, I have hereunto signed my name this 5th day of March, 1926.

ERIC CREWDSON.